Oct. 6, 1959 J. A. SOLAK 2,907,507

TELEPHONE CARRIERS AND DISPLAY RACKS

Filed May 6, 1957

INVENTOR.
JOHN A. SOLAK
BY Fulwider, Mattingly & Huntley
ATTORNEYS 2,907,507
Patented Oct. 6, 1959

2,907,507

TELEPHONE CARRIERS AND DISPLAY RACKS

John A. Solak, Covina, Calif.

Application May 6, 1957, Serial No. 657,326
4 Claims. (Cl. 224—45)

This invention relates generally to carrying devices and more particularly to carrying devices for telephones.

In the installation and display of modern telephones, it is frequently desirable to carry several telephones into a house or office for displays to the person obtaining the service. Usually four telephone instruments are used to demonstrate different styles as well as different colors of telephones.

In the past, it has been the practice to carry these telephones in the usual shipping containers or loose outside of containers. Either system has the disadvantage that the telephones are cumbersome and hard to handle. In many instances the instruments may be dropped, damaged or broken and a great deal of time is lost attempting to properly display them to the prospective users.

In addition to these problems a telephone truck is generally crowded with equipment and tools and there are limited spaces available for storage of extra instruments, particularly in condition to be displayed.

I have devised a carrying device which is peculiarly adapted to carry a multiple number of telephones so exposed that the color and style may be readily observed, and so packed as to be readily stored on an accessible place within a telephone truck.

The principal object of my invention is to provide a carrying device to carry and display a multiple number of telephone instruments. A further object of my invention is to provide such a device which can easliy be stored in a convenient location upon a telephone installation or repair truck. A still further object of my invention is to provide such a device that telephones may easily be removed and replaced from their carrying locations.

These and other objects and advantages of my invention will be apparent from the following description and the attached drawings, in which.

Figures 1, 2, 3, 4:
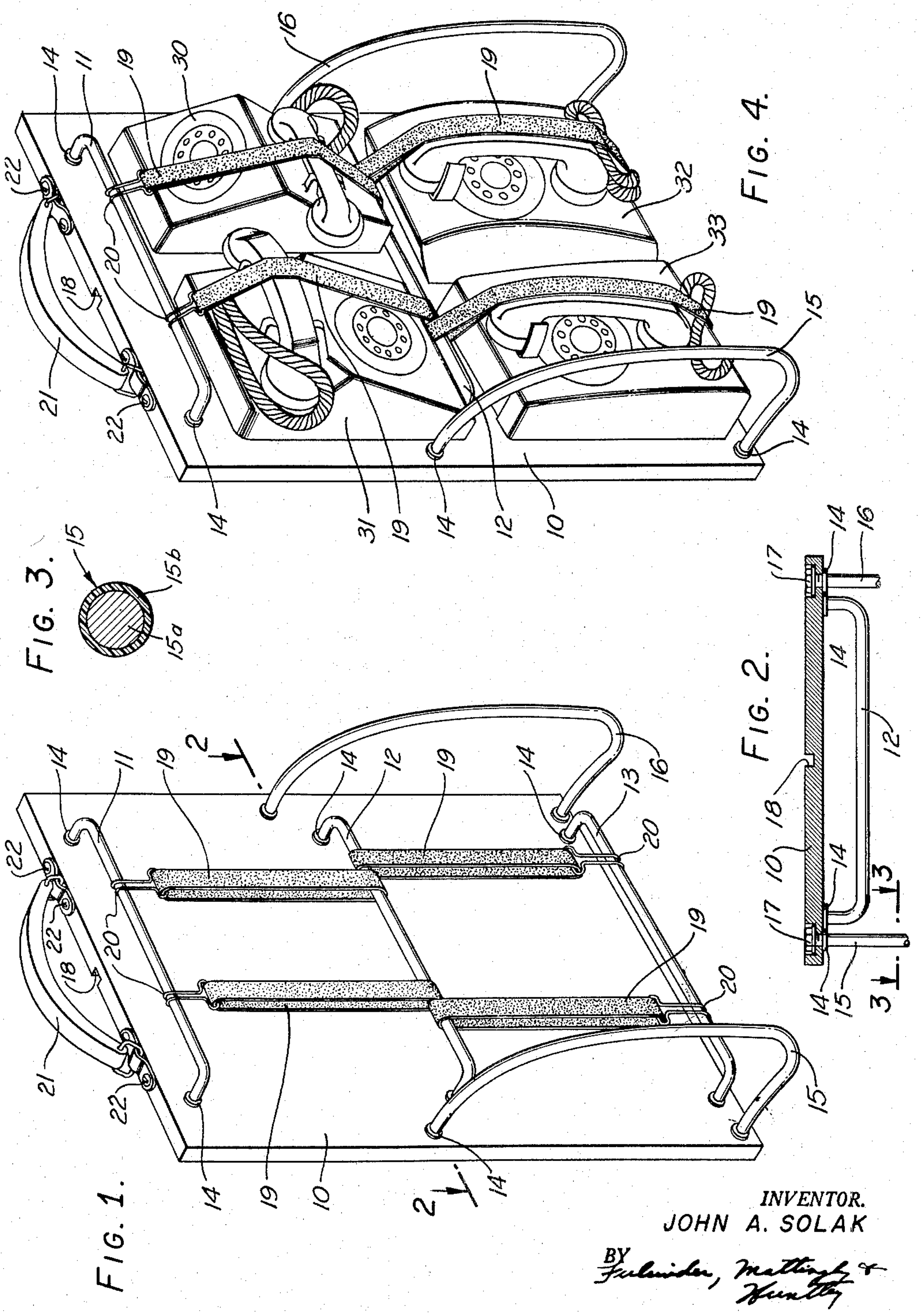
Figure 1 is a perspective view of a preferred embodiment of my invention, without telephone instruments in place.
Figure 2 is a section through 2—2 of Figure 1.
Figure 3 is a section through 3—3 of Figure 2.
Figure 4 is a perspective view of the invention with four telephones in place.

Three rods 11, 12 and 13 are attached to the front side of a rectangular base 10 of plywood or the like. The rods 11, 12, 13 are bent at either end at 90 degrees to the main portion of the rod, and the ends are threaded (not shown). The threaded ends are inserted through holes in the base 10, and nuts (not shown) are screwed onto the threaded ends on the back side of the base 10. Collars 14 are placed upon the rods 11, 12, 13 at the upper side of the base 10, so that the rods may be held fixedly by fastening the nuts on the other side of base 10.

Two guard and stand rods 15 and 16 are fastened to the base 10 in a similar manner. The rods 15 and 16 have shoulders 14 at the upper side of the base 10, and the ends thereof are inserted through holes in the base 10, where they are secured by nuts 17 counter-sunk within the back side of the base 10, as particularly shown in Figure 2.

The fastening system for rods 11, 12 and 13 is like that shown for the stand and guard rods 15, 16 in the sectional view of Figure 2.

By reference to Figure 3, it will be seen that the rod 15 consists of a metal rod 15*a* covered with a film of plastic or other resilient covering 15*b*. By utilizing this type rod, great strength is achieved and at the same time the soft, resilient covering protects the instruments from damage which could occur from exposed metal.

The base 10 has a vertical slot 18 extending its length through the center of the rear or back side of the base 10. This slot 18 is so fitted and provided that a rod normally existing on the cleaverage tool portion of an installation or repair truck may rest within the slot 18 and thus allow the device to be cleared and stored with the minimum lost space.

Elastic straps 19 with hooks 20 are looped over the center rod 12. Two of the straps are hooked to rod 11 and two to rod 13. These elastic straps are used to hold telephones 30, 31, 32 and 33 in place upon the device as illustrated in Figure 4. A handle 21 is fastened to the upper end of the base 10 by screws 22.

In usage, the telephone repair man, installation man, salesman or demonstrator places four telephones 30, 31, 32 and 33 upon the base 10 and fastens the four straps 19 over the telephones by means of their hooks 20.

As shown, the straps will accommodate different types of telephones and hold them securely in position in such manner that the receivers will not fall loose. When the device is stored upon the truck it is placed so that a rod which exists upon such truck fits into the slot 18 in such manner that this space is properly utilized and in addition the rod fitting within the space 18 acts to hold the device so that it will not fall or slide from its position.

When it is desired to use the device or display telephones, the individual using the same carries the device by the handle 21 and stands the same upright on the floor upon the bottom edge of the base 10 and the front protruding edges of the guard and stand rods 15 and 16. The device may also be laid upon the floor or an article of furniture.

If it is desired to remove one of the telephones for particular inspection, replacement or actual installation, all that is necessary is to unhook the hook 20 from the appropriate rod and remove the telephone instrument from its location.

It will be clear that the base of the device might be formed of a number of different materials, such as plastic, metal and the like, and that a number of other modifications might easily be made without departing from the scope of the invention as disclosed.

While the particular embodiment shown and described is fully capable of achieving the objects and advantages desired, it is clear that many modifications may be made by one skilled in the art without departing from the inventive concept, and it is not desired to limit the same except as may be necessary by reference to the attached claims.

I claim:

1. A device of the character described consisting of a base; two guard and stand rods fastened to said base and projecting therefrom at an angle so that the base may stand upright upon the bottom edge of the base and said stand rods; a center rod fastened to said base running horizontally thereof with reference to said base when the same is standing upright upon said stand rods; a plurality of elastic bands fastened to said center rod; a second rod near the upper edge of said base and parallel to the center rod; a third rod fastened to said base near the lower edge thereof and parallel to said center rod; hooks upon each of said elastic straps engageable with said second and third rods; a slot running perpendicularly the length of said base in the center of the back side thereof to receive a rod upon a telephone repair truck; and a carrying handle fastened to the top edge of said base.

2. A carrier and display rack comprising a base, plurality of horizontal transverse U-shaped supporting rods having their ends secured to said base and extending outwardly therefrom in substantially parallel spaced relation, a pair of curved guard and stand rods having their ends secured to said base and extending outwardly along opposite vertical edges of said base on the same side of said supporting rods, the lower ends of said stand rods being secured adjacent the lower corners of said base and extending outwardly to cooperate with the lower edge of said base to support said rack in an upright position for display and storage, and a plurality of detachable elastic straps extending between adjacent rods, whereby a plurality of units may be mounted on said rack with their weights supported by said rods and resiliently held in position by said straps.

3. A rack as set forth in claim 2 wherein said base is provided with a vertical slot on the side opposite said rods, said slot being adapted to prevent lateral movement by engaging a fixed vertical rod and in cooperation with said stand rods and said supporting rods maintaining said rack and units in a fixed position during storage.

4. A rack as set forth in claim 2 wherein said base is provided with a handle at its upper end whereby said rack may be readily picked up, transported and set up for storage and display.

References Cited in the file of this patent

UNITED STATES PATENTS

| | | |
|---|---|---|
| 1,799,877 | Wheary et al. | Apr. 7, 1931 |
| 2,066,822 | Cohen | Jan. 5, 1937 |
| 2,200,247 | Haas | May 14, 1940 |
| 2,497,477 | Stoops | Feb. 14, 1950 |
| 2,836,334 | Davis | May 27, 1958 |